United States Patent
Hayashi et al.

(10) Patent No.: US 7,376,390 B2
(45) Date of Patent: May 20, 2008

(54) RADIO CONTROL APPARATUS, MOBILE COMMUNICATION METHOD, MOBILE COMMUNICATION PROGRAM, AND MOBILE COMMUNICATION SYSTEM

(75) Inventors: Takahiro Hayashi, Kanagawa (JP); Yoshihiro Ishikawa, Kanagawa (JP); Takehiro Nakamura, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 465 days.

(21) Appl. No.: 10/496,788

(22) PCT Filed: Dec. 5, 2002

(86) PCT No.: PCT/JP02/12773

§ 371 (c)(1),
(2), (4) Date: Jun. 4, 2004

(87) PCT Pub. No.: WO03/049327

PCT Pub. Date: Jun. 12, 2003

(65) Prior Publication Data

US 2005/0041615 A1    Feb. 24, 2005

(30) Foreign Application Priority Data

Dec. 7, 2001    (JP)    ............................. 2001-374648

(51) Int. Cl.
H04B 7/00    (2006.01)
H04Q 7/20    (2006.01)
(52) U.S. Cl. .................. 455/39; 455/69; 455/522; 370/328

(58) Field of Classification Search ........ 370/328–330, 370/336–337; 455/69, 522
See application file for complete search history.

(56) References Cited

U.S. PATENT DOCUMENTS 5,822,318 A * 10/1998 Tiedemann et al. ......... 370/391

(Continued)

FOREIGN PATENT DOCUMENTS

CN    1263681 A    8/2000

(Continued)

OTHER PUBLICATIONS

3rd Generation Partnership Project; Technical Specification Group Radio Access Network; Physical layer procedures (FDD) (Release 4), Technical Specification 3GPP TS 25.214 v4.2.0 (Sep. 2001).

(Continued)

Primary Examiner—Simon Nguyen
(74) Attorney, Agent, or Firm—Oblon, Spivak, McClelland, Maier & Neustadt, P.C.

(57) ABSTRACT

A radio control apparatus has a transmission speed control section and a memory section. The transmission speed control section calculates the transmission power of a data signal to be transmitted to a cell phone based on the transmission power of a control signal to be transmitted to the cell phone and an offset value to be applied to the transmission power of the control signal. The transmission speed control section compares the transmission power of the data signal with an upper limit value stored in the memory section, and performs control to decrease the transmission speed of the data signal when the transmission power of the data signal is greater than the upper limit value and to increase the transmission speed of the data signal when the transmission power of the data signal is less than or equal to the upper limit value.

13 Claims, 7 Drawing Sheets

U.S. PATENT DOCUMENTS

| | | | |
|---|---|---|---|
| 6,393,276 B1 * | 5/2002 | Vanghi | 455/422.1 |
| 6,400,929 B1 | 6/2002 | Ue et al. | |
| 6,760,596 B1 * | 7/2004 | Fiorini et al. | 455/522 |
| 6,898,192 B2 * | 5/2005 | Chheda et al. | 370/311 |
| 6,909,905 B2 * | 6/2005 | Umeda et al. | 455/522 |
| 7,046,966 B2 * | 5/2006 | Davis | 455/69 |
| 2003/0003905 A1 * | 1/2003 | Shvodian | 455/423 |
| 2003/0083088 A1 * | 5/2003 | Chang et al. | 455/522 |
| 2006/0019610 A1 * | 1/2006 | Ue et al. | 455/69 |

FOREIGN PATENT DOCUMENTS

| | | |
|---|---|---|
| JP | 11-74835 | 3/1999 |
| JP | 2000-49663 | 2/2000 |
| JP | 2001-189693 | 7/2001 |
| JP | 2001-333123 | 11/2001 |

OTHER PUBLICATIONS

3$^{rd}$ Generation Partnership Project (3GPP): Technical Specification Group (TSG) Radio Access Network (RAN); Working Group 1(WG1); Physical channels and mapping of transport channels onto physical channels (FDD), TS25.211 v2.4.0 (Sep. 1999) Technical Specification.

3$^{rd}$ Generation Partnership Project; Technical Specification Group Radio Access Network; Multiplexing and channel coding (FDD) (Release 1999), 3GPP TS 25.212 v3.5.0.(Dec. 2000) Technical Specification.

3$^{rd}$ Generation Partnership Project; Technical Specification Group Radio Access Network; Physical layer procedures (FDD) (Release 1999), 3GPP TS 25.214 v3.5.0. (Dec. 2000) Technical Specification.

* cited by examiner

| TERMINAL ID | DSCH TRANSMISSION SPEED R (kbps) | A-DPCH TRANSMISSION POWER(dBm) | | | | OFFSET VALUE (dB) | | | |
|---|---|---|---|---|---|---|---|---|---|
| | | t-k | t-k+1 | ... t | AVERAGE VALUE A | t-k | t-k+1 | ... t | AVERAGE VALUE O |
| 1 | 256 | 23 | 26 | 23 | 24 | 11.0 | 13.3 | 13.2 | 12.5 |
| 2 | 128 | 25 | 23 | 27 | 25 | 9.7 | 11.5 | 9.4 | 10.2 |
| ⋮ | ⋮ | ⋮ | ⋮ | ⋮ | ⋮ | ⋮ | ⋮ | ⋮ | ⋮ |
| N | 64 | 24 | 23 | 25 | 23 | 4.5 | 4.3 | 7.1 | 5.3 |

| DSCH ALLOWABLE MAXIMUM TRANSMISSION POWER T (dBm) | 36.0 |
|---|---|

| DSCH TRANSMISSION SPEED (kbps) | INITIAL OFFSET VALUE $O_i$ (dB) |
|---|---|
| 384 | 16.0 |
| 256 | 13.0 |
| 128 | 10.0 |
| 64 | 7.0 |

RADIO CONTROL APPARATUS, MOBILE COMMUNICATION METHOD, MOBILE COMMUNICATION PROGRAM, AND MOBILE COMMUNICATION SYSTEM

TECHNICAL FIELD

The present invention relates to a radio control apparatus, a mobile communication method, a mobile communication program, and a mobile communication system.

BACKGROUND ART

Recently, with the development of radio communication technology, a mobile communication system capable of high-speed and reliable data transfer has been in use. Particularly, in a mobile packet communication system, which uses the code division multiplexing scheme such as W-CDMA (Wideband-Code Division Multiple Access) and CDMA-2000, a technique in which communication channels are selectively used depending on the characteristics of the signal to be transmitted to a mobile communication terminal is adopted as a method of downward transmission.

For transmission of control signals, the A-DPCH (Associated-Dedicated Physical CHannel) is used which is an individual downward channel (a channel dedicated to each terminal) suitable for high-speed transmission power control. To the contrary, for transmission of data signals, time division multiplexed communication is carried out using the DSCH (Downlink Shared CHannel), which is a common channel that allows radio resources to be used effectively among a plurality of mobile communication terminals. As described above, by appropriately switching the channels to be used depending on the property of the signals, an effective signal transmission is carried out which makes use of the advantages of both channels in a mutually complementary manner.

DISCLOSURE OF THE INVENTION

However, there are some problems in the above-described conventional art as follows. That is, in the mobile communication system using the code division multiplexing scheme, the same frequency band is used in all of the cells to provide services. Accordingly, the same frequency band may be populated in a mixed manner with data communicated by a plurality of services including circuit switching services such as voice communication and ISDN (Integrated Services Digital Network) and packet switching services. In order to handle such a communication mode, the upper limit value of transmission power is set up not only for each base station but also for each of the services.

For example, suppose a case where the total transmission power which a base station can allocate to mobile communication terminals is 100. A mode may be considered where a cell containing a large number of users in voice communication is allocated 60 of the transmission power to be used for the circuit switching services and 40 of the transmission power to be used for the packet switching services. To the contrary, another mode may also be considered where a cell containing a large number of users in data communication is allocated 20 of the transmission power to be used for the circuit switching services and 80 of the transmission power to be used for the packet switching services.

As described above, depending on the cells visited by mobile communication terminals and the usage situation of services, the upper limit value of the transmission power varies with time, and the available transmission power is limited. On the other hand, in the DSCH, although the transmission speed can be changed at regular intervals of time (for example, 10 ms) in accordance with standard regulations, the technique thereof has not been established. Therefore, a fixed transmission speed (for example, 384 kbps) is set up at the start of data transmission.

Accordingly, data may be transmitted and received at a transmission speed unsuitable for the transmission power. To be more precise, when the transmission speed is higher than the transmission speed suitable for the transmission power, the DSCH cannot be supplied with sufficient transmission power, resulting in a reduction of communication quality of the data. To the contrary, when the transmission speed is lower than the transmission speed suitable for the transmission power, the data will be communicated at a lower transmission speed although the data could be transmitted at a higher speed.

The present invention has been proposed in view of the above-described problems. An object of the present invention is to provide a radio control apparatus, a mobile communication method, a mobile communication program and a mobile communication system, which controls the transmission speed in accordance with the transmission power, thereby achieving a high-speed data communication while suppressing the decrease of communication quality.

The present invention provides a radio control apparatus for controlling downward packet communication between a mobile communication terminal and a base station by using a channel specific to each of a plurality of mobile communication terminals to cause a control signal to be transmitted and using a channel common to the plurality of mobile communication terminals in a time-division manner to cause a data signal to be transmitted, comprising: calculation means for calculating, based on a transmission power of the control signal to be transmitted to a particular mobile communication terminal of said plurality of mobile communication terminals and an offset value to be applied to the transmission power of the control signal, the transmission power of the data signal to be transmitted to said particular mobile communication terminal; storage means for storing an upper limit value of the transmission power of said data signal; comparison means for comparing the transmission power of the data signal calculated by said calculation means with said upper limit value stored in said storage means; and control means for performing control, as a result of comparison by said comparison means, to decrease the transmission speed of said data signal when the transmission power of said data signal is greater than said upper limit value, and to increase the transmission speed of said data signal when the transmission power of said data signal is less than said upper limit value.

The present invention provides a mobile communication method performed by a radio control apparatus for controlling downward packet communication between a mobile communication terminal and a base station by using a channel specific to each of a plurality of mobile communication terminals to cause a control signal to be transmitted and using a channel common to the plurality of mobile communication terminals in a time-division manner to cause a data signal to be transmitted, comprising: a calculating step of calculating, by said radio control apparatus, based on a transmission power of the control signal to be transmitted to a particular mobile communication terminal of said plurality of mobile communication terminals and an offset value to be applied to the transmission power of the control signal, the transmission power of the data signal to be transmitted to said particular mobile communication terminal; a storing step of storing, by said radio control apparatus, an upper limit value of the transmission power of said data signal in storage means; a comparing step of comparing, by said radio control apparatus, the transmission power of the data signal calculated in said calculating step with said upper limit value stored in said storage means; and a controlling step of performing control, by said radio control apparatus, as a result of comparison in said comparing step, to decrease the transmission speed of said data signal when the transmission power of said data signal is greater than said upper limit value, and to increase the transmission speed of said data signal when the transmission power of said data signal is less than said upper limit value.

The present invention provides a mobile communication program for controlling downward packet communication between a mobile communication terminal and a base station by using a channel specific to each of a plurality of mobile communication terminals to cause a control signal to be transmitted and using a channel common to the plurality of mobile communication terminals in a time-division manner to cause a data signal to be transmitted, instructing a computer to perform: a calculating operation for calculating, based on a transmission power of the control signal to be transmitted to a particular mobile communication terminal of said plurality of mobile communication terminals and an offset value to be applied to the transmission power of the control signal, the transmission power of the data signal to be transmitted to said particular mobile communication terminal; a storing operation for storing an upper limit value of the transmission power of said data signal in storage means; a comparing operation for comparing the transmission power of the data signal calculated by said calculating operation with said upper limit value stored in said storage means; and a controlling operation for performing control, as a result of comparison by said comparing operation, to decrease the transmission speed of said data signal when the transmission power of said data signal is greater than said upper limit value, and to increase the transmission speed of said data signal when the transmission power of said data signal is less than said upper limit value.

According to these inventions, depending on the transmission power of the control signal transmitted on a channel specific to each of a plurality of mobile communication terminals, the transmission speed of the data signal transmitted on a channel common to the plurality of mobile communication terminals in a time-division manner is dynamically controlled. That is, when the transmission power of the data signal is greater than an upper limit value, a control for decreasing the transmission speed of the data signal is carried out. Owing to this control, since a sufficient transmission power suitable for the transmission speed can be supplied to the DSCH, the communication quality of the data is increased. This enables to reduce the retransmission rate due to transmission error and the interference with other radio connections, resulting in an increase of transmission capacity per unit time (throughput). On the other hand, when the transmission power of the data signal is less than or equal to the upper limit value, a control for increasing the transmission speed of the data signal is carried out. Owing to this control, it is possible to increase the speed of the data transmission. As a result, it is possible to achieve a high-speed data communication while suppressing the decrease of communication quality.

Preferably, the calculation means of the radio control apparatus calculates the transmission power of said data signal based on an average value of the transmission powers of said control signal over a predetermined period of time and an average value of said offset values over a predetermined period of time.

Preferably, the calculating step in the mobile communication method comprises calculating the transmission power of said data signal based on an average value of the transmission powers of said control signal over a predetermined period of time and an average value of said offset values over a predetermined period of time.

Preferably, the calculating operation performed by the mobile communication program comprises calculating the transmission power of said data signal based on an average value of the transmission powers of said control signal over a predetermined period of time and an average value of said offset values over a predetermined period of time.

According to these inventions, the transmission power of the data signal is calculated based on an average value of the transmission powers of the control signal and an average value of the offset values. This enables to control the transmission speed of the data signal based on a precise transmission power from which influence of fluctuation of the transmission power and/or offset value accompanying accidental changes in the communication environment is maximally eliminated.

Also preferably, the radio control apparatus further comprises low-speed transmission power calculation means for calculating the transmission power of the data signal in the case of having decreased the transmission speed of said data signal when the transmission power of said data signal is greater than said upper limit value as a result of comparison by said comparison means, wherein said control means performs control to decrease the transmission speed of said data signal until the transmission power of the data signal calculated by said low-speed transmission power calculation means becomes less than or equal to said upper limit value.

Also preferably, the mobile communication method further comprises a low-speed transmission power calculating step of calculating, by said radio control apparatus, the transmission power of the data signal in the case of having decreased the transmission speed of said data signal when the transmission power of said data signal is greater than said upper limit value as a result of comparison in said comparing step, wherein said controlling step comprises performing control to decrease the transmission speed of said data signal until the transmission power of the data signal calculated in said low-speed transmission power calculating step becomes less than or equal to said upper limit value.

Also preferably, the mobile communication program further instructs the computer to perform a low-speed transmission power calculating operation for calculating the transmission power of the data signal in the case of having decreased the transmission speed of said data signal when the transmission power of said data signal is greater than said upper limit value as a result of comparison in said comparing operation, wherein said controlling operation instructs the computer to perform an operation to decrease the transmission speed of said data signal until the transmission power of the data signal calculated by said low-speed transmission power calculating operation becomes less than or equal to said upper limit value.

According to these inventions, the transmission speed of the data signal is controlled so that the transmission power of the data signal becomes less than or equal to the upper limit value. And at a point of time when the transmission power of the data signal becomes less than or equal to the upper limit value, the control for decreasing the transmission speed of the data signal is terminated. Accordingly, when the transmission speed of the data signal is decreased to maintain the communication quality, the transmission speed is not decreased more than necessary. As a result, data transmission can be achieved while maintaining the communication quality as well as suppressing the decrease of transmission speed.

Still preferably, the radio control apparatus further comprises high-speed transmission power calculation means for calculating the transmission power of the data signal in the case of having increased the transmission speed of said data signal when the transmission power of said data signal is less than said upper limit value as a result of comparison by said comparison means, wherein said control means performs control to increase the transmission speed of said data signal until the transmission power of the data signal calculated by said high-speed transmission power calculation means reaches a maximum value within a range in which said upper limit value is not exceeded.

Still preferably, the mobile communication method further comprises a high-speed transmission power calculating step of calculating, by said radio control apparatus, the transmission power of the data signal in the case of having increased the transmission speed of said data signal when the transmission power of said data signal is less than said upper limit value as a result of comparison in said comparing step, wherein said controlling step comprises performing control to increase the transmission speed of said data signal until the transmission power of the data signal calculated in said high-speed transmission power calculating step reaches a maximum value within a range in which said upper limit value is not exceeded.

Also preferably, the mobile communication program further instructs the computer to perform a high-speed transmission power calculating operation for calculating the transmission power of the data signal in the case of having increased the transmission speed of said data signal when the transmission power of said data signal is less than said upper limit value as a result of comparison in said comparing operation, wherein said controlling operation instructs the computer to perform an operation to increase the transmission speed of said data signal until the transmission power of the data signal calculated by said high-speed transmission power calculating operation reaches a maximum value within a range in which said upper limit value is not exceeded.

According to these inventions, the transmission speed of the data signal is controlled so that its maximum value is obtained within an allowable range of transmission speed of the data signal. Accordingly, it is possible to carry out the data transmission at a highest transmission speed within a range in which the communication quality can be maintained. As a result, the throughput can be increased more easily.

Also, when a computer-readable recording medium on which the above-described mobile communication program is stored is sold and distributed as a stand-alone or attached product, it is possible to practice the mobile communication technique according to the present invention widely and inexpensively. Furthermore, it may be operated as a mobile communication system comprised of the above-described radio control apparatus and a base station, where the base station is controlled by the control means of the radio control apparatus and transmits data signals to mobile communication terminals at a transmission speed of the data signals.

BEST MODE FOR CARRYING OUT THE INVENTION

Referring to the attached drawings, an embodiment of the present invention will now be described in detail.

Figure 1:
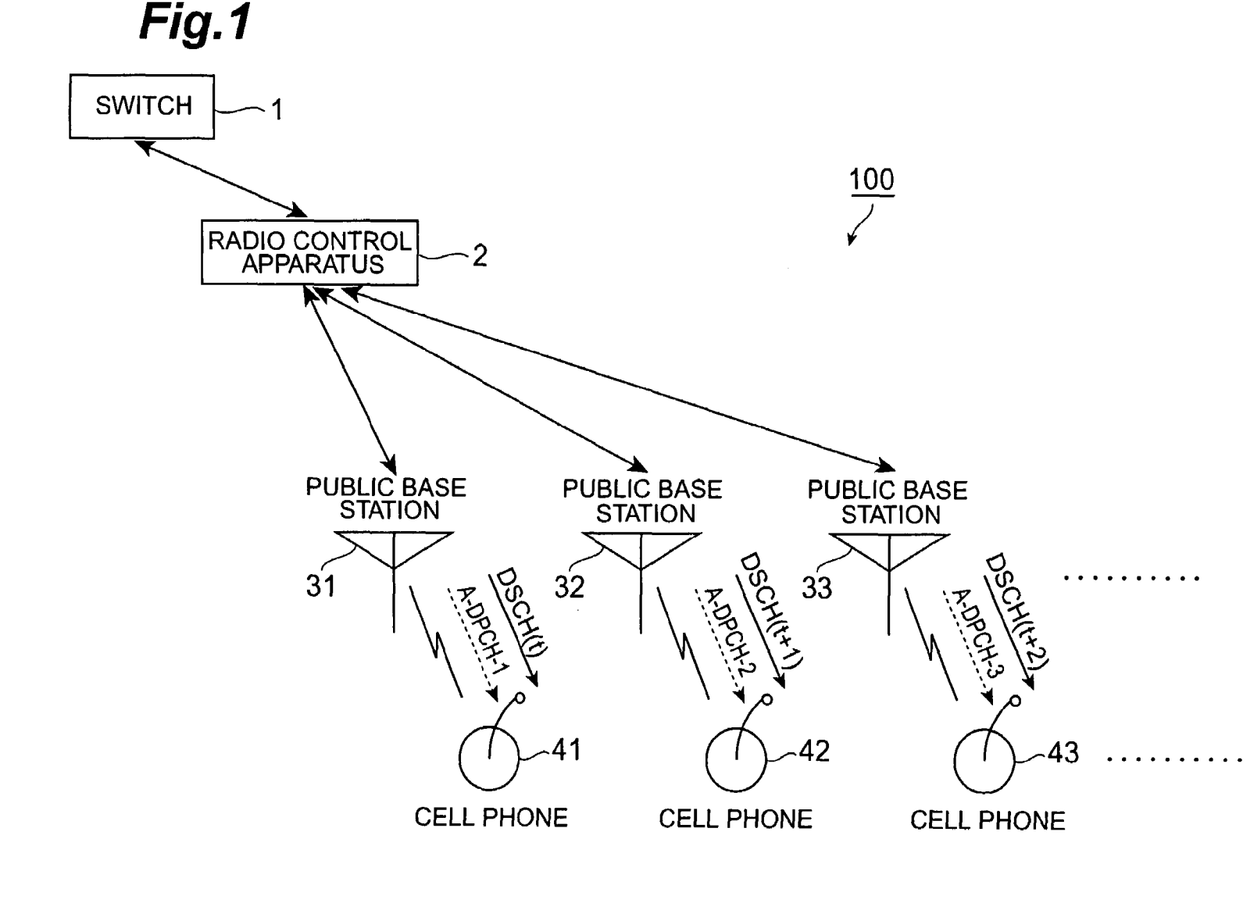
FIG. 1 is a conceptual diagram showing an example of an entire configuration of a mobile communication system according to the present invention.

First, the configuration will be described. FIG. 1 is a schematic diagram showing an example of the entire configuration of a mobile communication system 100 in the present embodiment. As shown in FIG. 1, the mobile communication system 100 comprises a switch 1 that functions as a relay point for public base stations, a radio control apparatus 2 that integrally controls packet communications between public base stations and cell phones, public base stations 31, 32, 33, . . . that perform radio communication directly with cell phones within a predetermined communication area, and cell phones (corresponding to mobile communication terminals) 41, 42, 43, . . . that are carried and used by users. The above elements form a hierarchy being connected to each other to allow two-way communication.

As the premises for the description, assuming that, in a downward radio connection (hereinafter referred to as "downlink") from a public base station toward a cell phone, a plurality of signals having characteristics different from each other are transmitted, the mobile communication system 100 uses two kinds of channels. That is, when a control signal requiring relatively small transmission power is transmitted, a downward channel (hereinafter referred to as "A-DPCH") individually allocated to each cell phone is used. To the contrary, when a data signal requiring large transmission power and high-speed performance is transmitted, a channel common to a plurality of cell phones (hereinafter referred to as "DSCH") is used in a time-division manner.

Figure 2:
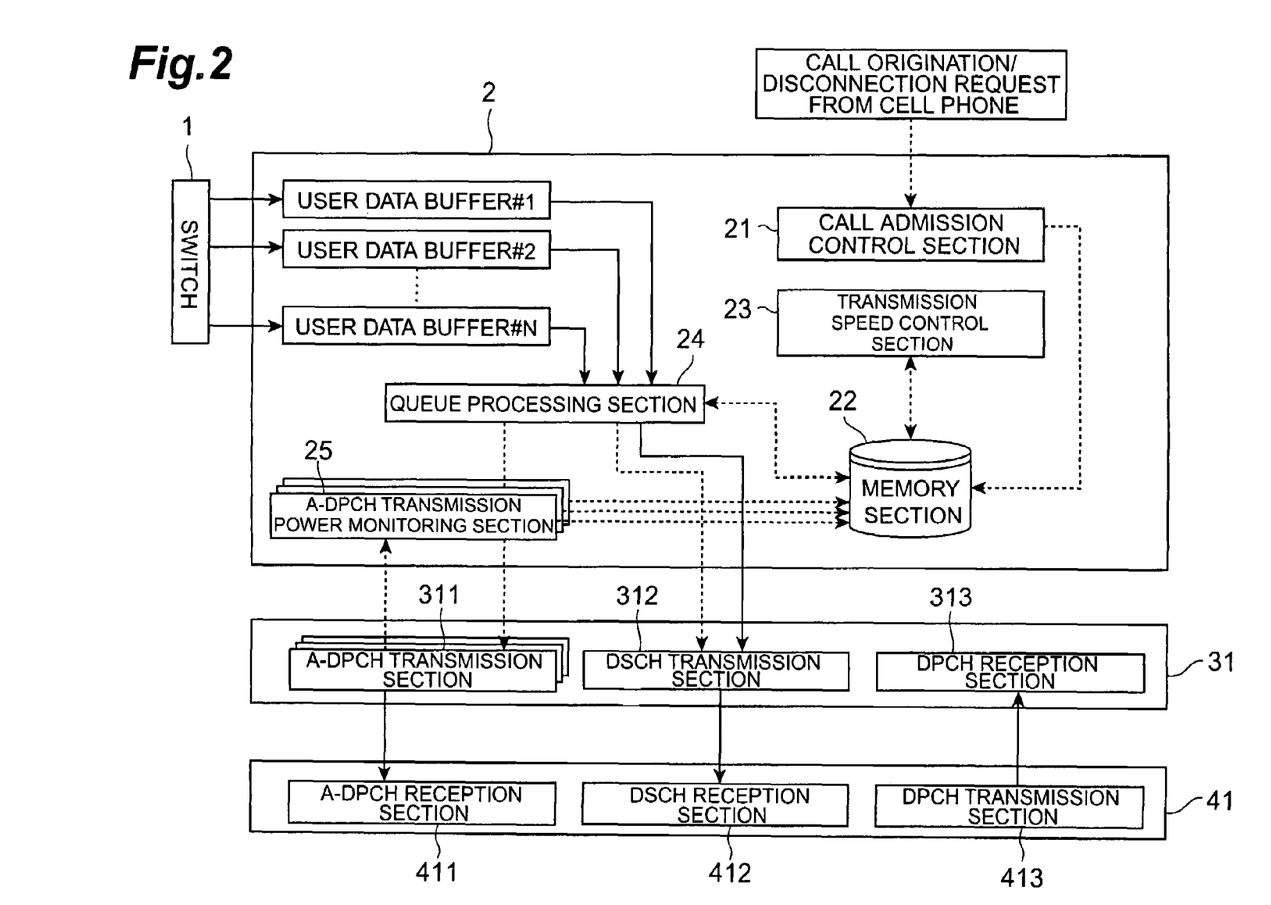
FIG. 2 is a schematic diagram for illustrating a functional configuration of the mobile communication system.

Referring to FIG. 2, the internal configuration of the radio control apparatus 2 will now be described in detail. FIG. 2 is a block diagram showing a functional configuration of the radio control apparatus 2. As shown in FIG. 2, the radio control apparatus 2 comprises a call admission control section 21, a memory section 22 (corresponding to storage means), a transmission speed control section 23 (corresponding to calculation means, comparison means, control means, low-speed transmission power calculation means, and high-speed transmission power calculation means), a queue processing section 24, and an A-DPCH transmission power monitoring section 25, where the sections are connected to each other via a bus. Arrows in the figure indicate the transmission direction of signals. Dotted lines indicate that the signals are control signals, and solid lines indicate data signals. Each of the components will be described in detail below.

The call admission control section 21 monitors call origination requests and disconnection requests from any one of the cell phones 41, 42, 43, . . . and determines whether the request should be admitted. When admission is permitted, a user data buffer is reserved for the admitted cell phone, and a wired connection with the switch 1 is set up. At the same time, the call admission control section 21 forms a data storage region for the admitted cell phone in a transmission power storage section 221 of the memory section 22 described later, and initializes the same.

Figure 3A:
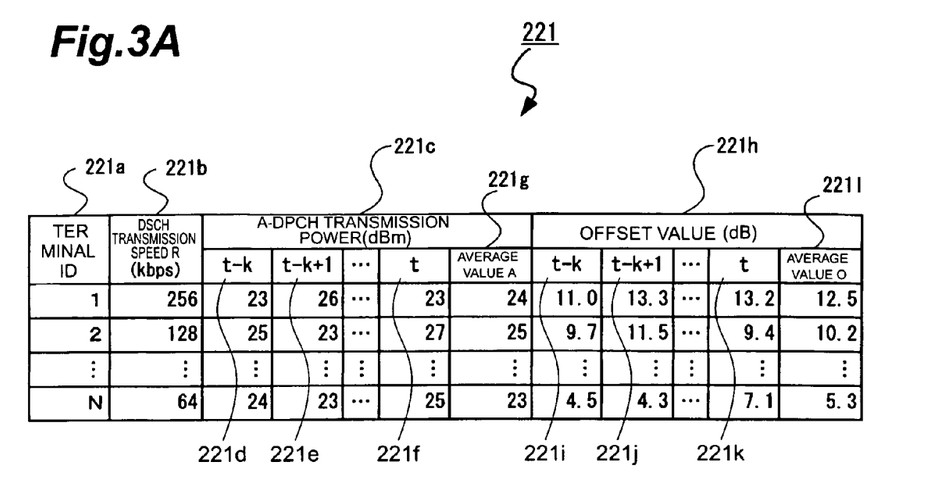
FIG. 3A is a diagram showing an example of data storage within a transmission power storage section.
Figure 3B:
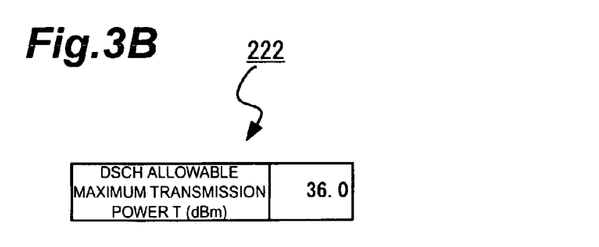
FIG. 3B is a diagram showing an example of data storage within an allowable maximum transmission power storage section.
Figure 3C:
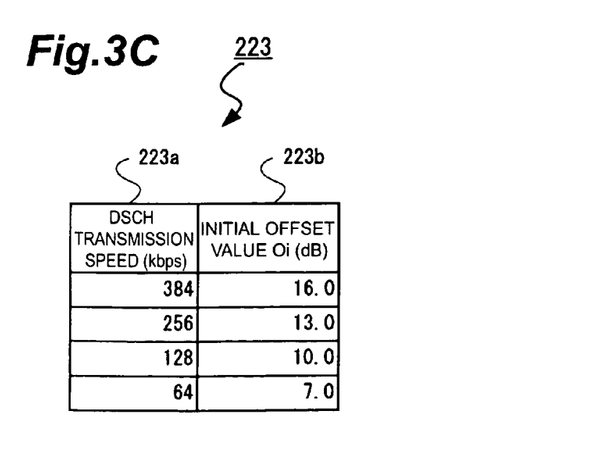
FIG. 3C is a diagram showing an example of data storage within an initial offset value storage section.

The memory section 22 comprises a transmission power storage section 221, an allowable maximum transmission power storage section 222, and an initial offset value storage section 223. Referring to FIGS. 3A to 3C, an example of the data storage within the memory section 22 will be described in detail.

As shown in FIG. 3A, the transmission power storage section 221 contains a terminal ID storage region 221*a*, a transmission speed storage region 221*b*, a transmission power storage region 221*c*, and an offset value storage region 221*h*. The terminal ID storage region 221*a* stores a numerical data (for example, "1", "2", . . . ,"N") as "terminal ID", which data is uniquely assigned to each of the cell phones in order to identify them. The transmission speed storage region 221*b* stores a numerical value data (for example, "256", "128", . . . , "64") as "transmission speed", which data indicates the transmission speed (in kbps) of data at time t when the DSCH is used in such a manner that the values can be sequentially updated with latest values.

The transmission power storage region 221*c* is a data storage region that stores the time-varying transmission powers (in dBm) of the A-DPCH in a historical order. In order to enable such a storage mode, the transmission power storage region 221*c* contains a time (t−k) data storage region 221*d*, a time (t−k+1) data storage region 221*e*, . . . , a time t data storage region 221*f*, and an average value storage region 221*g*.

To be more precise, the time (t−k) data storage region 221*d* is a region in which the transmission power (for example, "23", "25", . . . , "24") of the A-DPCH obtained at a point of time earlier than the current time t by a period of time k is recorded. The value k is, for example, 200-300 ms. Likewise, the time (t−k+1) data storage region 221*e* is a region in which the transmission power (for example, "26", "23", . . . , "23") of the A-DPCH obtained at a point of time earlier than the current time t by a period of time k−1 is recorded. Further, the time t data storage region 221*f* is a region in which the transmission power (for example, "23", "27", . . . , "25") of the A-DPCH obtained at time t (current) is recorded.

The average value storage region 221*g* is a region in which the average value (for example, "24", "25", . . . , "23") of the transmission powers of the A-DPCH in a period of time k from time (t−k) to time t is recorded. Practically, the average value storage region 221*g* stores the average value of all data of the transmission powers of the A-DPCH corresponding to each terminal ID within the period of time from time (t−k) to time t. However, for simplicity, it is assumed that the average value of three data is stored.

Further, the offset value storage region 221*h* is a data storage region that stores time-varying offset values (in dB) in a historical order. Here, the offset value refers to a value that may be applied (added, multiplied or otherwise) to the transmission power of the A-DPCH in order to determine the transmission power of the DSCH. The offset value varies with time based on the reception error rate or the like of the mobile communication terminal. Generally, the offset value gets greater when the transmission speed of the DSCH is higher, while it gets smaller when the transmission speed of the DSCH is lower. Further, the offset value gets smaller when the radio connection condition is better, while it gets greater when the radio connection condition is worse.

In order to enable the above-described storage mode, the offset value storage region 221*h* contains a time (t−k) data storage region 221*i*, a time (t−k+1) data storage region 221*j*, . . . , a time t data storage region 221*k*, and an average value storage region 221*l*.

To be more precise, the time (t−k) data storage region 221*i* is a region in which the offset value (for example, "11.0", "9.7", . . . , "4.5") obtained at a point of time earlier than the current time t by a period of time k is recorded. Likewise, the time (t−k+1) data storage region 221*j* is a region in which the offset value (for example, "13.3", "11.5", . . . , "4.3") obtained at a point of time earlier than the current time t by a period of time k−1 is recorded. Further, the time t data storage region 221*k* is a region in which the offset value (for example, "13.2", "9.4", . . . , "7.1") obtained at time t (current) is recorded.

The average value storage region 221*l* is a region in which the average value (for example, "12.5", "10.2", . . . , "5.3") of the offset values in a period of time k from time (t−k) to time t is recorded. Practically, the average value storage region 221*l* stores the average value of all data of the offset values corresponding to each terminal ID within the period of time from time (t−k) to time t. However, for simplicity, it is assumed that the average value of three data is stored.

As shown in FIG. 3B, the allowable maximum transmission power storage section 222 stores a numerical value data (for example, "36.0") as "allowable maximum transmission power", which data indicates the upper limit value of the transmission power (in dBm) of the DSCH. For the allowable maximum transmission power, a value common to the public base stations 31, 32, 33, . . . may be used, or the value may be separately set for each public base station depending on the communication environment or the like.

The initial offset value storage section 223 stores an initial value of the offset value in association with the transmission speed of the DSCH. As shown in FIG. 3C, the initial offset value storage section 223 contains a transmission speed storage region 223*a* and an initial offset value storage region 223*b*. The transmission speed storage region 223*a* stores a numerical value data (for example, "384", "256", "128", "64") as "transmission speed", which data indicates the transmission speed (in kbps) of the data using the DSCH in a stepwise manner. The offset value storage region 223*b* stores a numerical value data (for example, "16.0", "13.0", "10.0", "7.0") as "initial offset value", which data indicates the offset value (in dB) applied to the transmission power of the A-DPCH when the communication is started or when the transmission speed is changed.

Referring to FIG. 2 again, the transmission speed control section 23 calculates the transmission power of the DSCH based on the transmission power of the A-DPCH and the offset value, determines the transmission speed of the DSCH in accordance with the calculated transmission power of the DSCH, and then instructs the public base stations 31, 32, 33 through the queue processing section 24 described later to transmit data signals at the determined transmission speed.

Also, the transmission speed control section 23 calculates an average value of the transmission powers of the A-DPCH and an average value of the offset values based on the data stored in the transmission power storage section 221.

The queue processing section 24 obtains the transmission speed of the DSCH from the transmission speed storage region 221b, and extracts transmission data having a volume of data (for example, number of packets) corresponding to the obtained transmission speed from the user data buffer. The queue processing section 24 transfers the transmission data to a DSCH transmission section 312 of the public base station 31 described later and instructs it to transmit the data to the cell phone 41. Also, the queue processing section 24 notifies the public base station 31 of the offset value to be applied to the transmission power of the A-DPCH.

The A-DPCH transmission power monitoring section 25 periodically monitors the transmission power of the A-DPCH between the public base station 31 described later and the cell phones 41, 42, 43, . . . , and then records the monitored results in the transmission power storage region 221c corresponding to the terminal ID of each cell phone formed in the transmission power storage section 221. Since the numerical value data indicating the transmission power of the A-DPCH is updated sequentially at the same time as the monitoring, the latest transmission power for each cell phone is always recorded in the transmission power storage region 221c.

The public base station 31 comprises at least an A-DPCH transmission section 311 that performs signal transmission using the A-DPCH as a communication channel, a DSCH transmission section 312 that performs signal transmission using the DSCH in a time-division manner, and a DPCH reception section 313 that performs signal reception using the DPCH, which is an upward channel.

The A-DPCH transmission section 311 transmits a control signal which previously notifies the cell phone 41 that a data signal is transmitted with the A-DPCH. Since the transmission of the control signal is carried out prior to the data transfer, the cell phone 41 can recognize the fact before receiving the data signal. This enables the public base station 31 to change arbitrarily the cell phone to which the data is transmitted. As for the transmission speed of the control signal, a fixed speed specified by a communication carrier or relevant standardization body is used.

Only when the A-DPCH transmission section 311 has transmitted the control signal, the DSCH transmission section 312 establishes a DSCH with the cell phone, and transmits the data signal using the DSCH. The transmission speed of the data signal is variably determined at predetermined intervals of time (for example, 10 ms) specified by the relevant standard. As will be described in detail later, the DSCH transmission section 312 applies the offset value specified by the queue processing section 24 to the transmission power of the A-DPCH to determine the transmission power of the DSCH.

The DPCH reception section 313 receives a control command for the transmission power of the DPCH from the cell phone 41. This control command allows the transmission power of the A-DPCH between the public base station 31 and the cell phone 41 to be optimally controlled.

Since the cell phone 41 is a well-known cell phone, the detailed description thereof will be omitted. The cell phone 41 comprises at least an A-DPCH reception section 411, a DSCH reception section 412 and a DPCH transmission section 413. The A-DPCH reception section 411 receives a control signal from the A-DPCH transmission section 311 of the public base station 31. If the DSCH reception section 412 previously receives a notice of transmission of a data signal via the control signal, the DSCH reception section 412 starts to receive the data signal from the DSCH transmission section 312 of the public base station 31. The DPCH transmission section 413 transmits a control command for optimally controlling the transmission power of the A-DPCH to the public base station 31 using the A-DPCH as a communication channel.

The configuration of each terminal device constituting the mobile communication system 100 according to the present invention has been described. Since the essential configuration of the public base stations 32, 33, . . . , and the cell phones 42, 43, . . . shown in FIG. 1 is the same as the configuration of the public base station 31 and the cell phone 41 described in detail, respectively, the illustration and the detailed description thereof will be omitted. That is, each of the public base stations 32 and 33 is provided with an A-DPCH transmission section 321, 331, a DSCH transmission section 322, 332 and a DPCH reception section 323, 333. Further, each of the cell phones 42 and 43 is provided with an A-DPCH reception section 421, 431, a DSCH reception section 422, 432 and a DPCH transmission section 423, 433.

Next, referring to FIGS. 4 to 6, the operations in the present embodiment will be described. Particular attention will now be paid to the case where a call origination request is made from the cell phone 41 (having terminal ID 1) visiting a communication area of the public base station 31 for describing illustratively the transmission speed control operations between the public base station 31 and the cell phone 41. However, the present invention is not limited to the transmission speed control technique between these devices.

Figure 4:
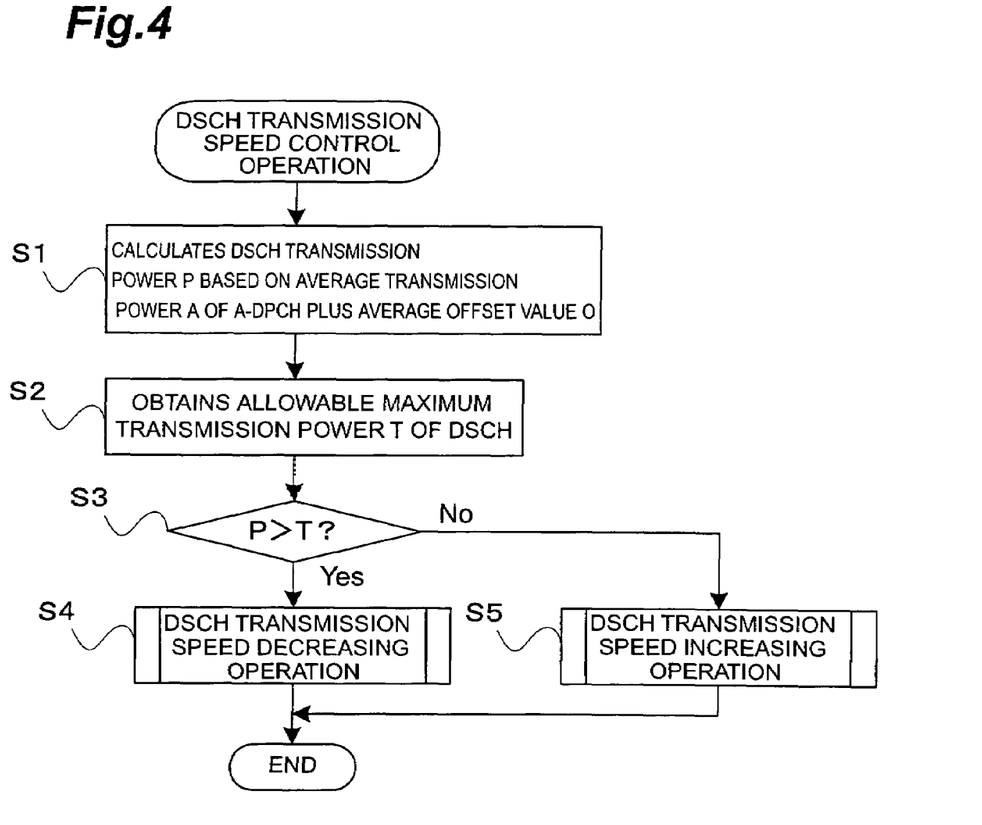
FIG. 4 is a flowchart for illustrating a DSCH transmission speed control operation.

FIG. 4 is a flowchart for illustrating the DSCH transmission speed control operation carried out by the radio control apparatus 2. First, in S1, the transmission speed control section 23 obtains an average value A of the transmission powers of the A-DPCH corresponding to the terminal ID "1" from the average value storage region 221g. The transmission speed control section 23 obtains an average value O of the offset values corresponding to the terminal ID "1" from the average value storage region 221l. The transmission speed control section 23 calculates a transmission power P of the DSCH from the obtained average value A of the transmission powers of the A-DPCH and the average value O of the offset values. For example, in the case of the transmission speed control operation between the cell phone 41 and the public base station 31, the average value A of the transmission powers of the A-DPCH is 24 dBm, and the average value O of the offset values is 12.5 dB. Accordingly, the transmission power of the DSCH is calculated as 36.5 dBm, which is the sum of them.

In this embodiment, since both of the average value A of the transmission powers of the A-DPCH and the average value O of the offset values are expressed in logarithm, the transmission power of the DSCH can be calculated by addition operation. In the case where both of the average value A of the transmission powers of the A-DPCH and the average value O of the offset values are actual numbers, the transmission power of the DSCH may be calculated by multiplication operation.

The reason why the transmission power of the DSCH is calculated by applying the offset value to the transmission power of the A-DPCH as described above is as follows. That is, the transmission power of the A-DPCH is always optimally controlled based on the control command transmitted from the cell phone 41 to the public base station 31 as described above. On the other hand, when the cell phone 41 receives a signal from the public base station 31, the A-DPCH and the DSCH are used at the same time using different spread codes. Accordingly, in the communication using the code division multiplexing scheme, the radio connection conditions of the A-DPCH and the DSCH can be regarded as the same. Therefore, the transmission power of the DSCH is adapted to be determined in conjunction with the transmission power of the A-DPCH by applying a given value (offset value) to the transmission power of the A-DPCH.

In S2, the transmission speed control section 23 obtains an allowable maximum transmission power T from the allowable maximum transmission power storage section 222. Then, the transmission speed control section 23 compares (S3) the transmission power P of the DSCH calculated in S1 with the allowable maximum transmission power T obtained in S2.

As a result of the comparison operation, when the transmission power P of the DSCH is greater than the allowable maximum transmission power T (i.e., in the case of P>T), the transmission speed control section 23 determines that the current transmission power of the DSCH is too large, and starts an operation for decreasing the transmission speed of the DSCH (S4). To the contrary, in S3, when the transmission power P of the DSCH is less than or equal to the allowable maximum transmission power T, (i.e., in the case of P≦T), the transmission speed control section 23 determines that the current transmission power of the DSCH is less than or equal to the upper limit value and the transmission speed of the DSCH may be increased, and starts the DSCH transmission speed increasing operation (S5). Following the completion of the operation S4 or S5, the sequence of the DSCH transmission speed control operations is terminated.

Figure 5:
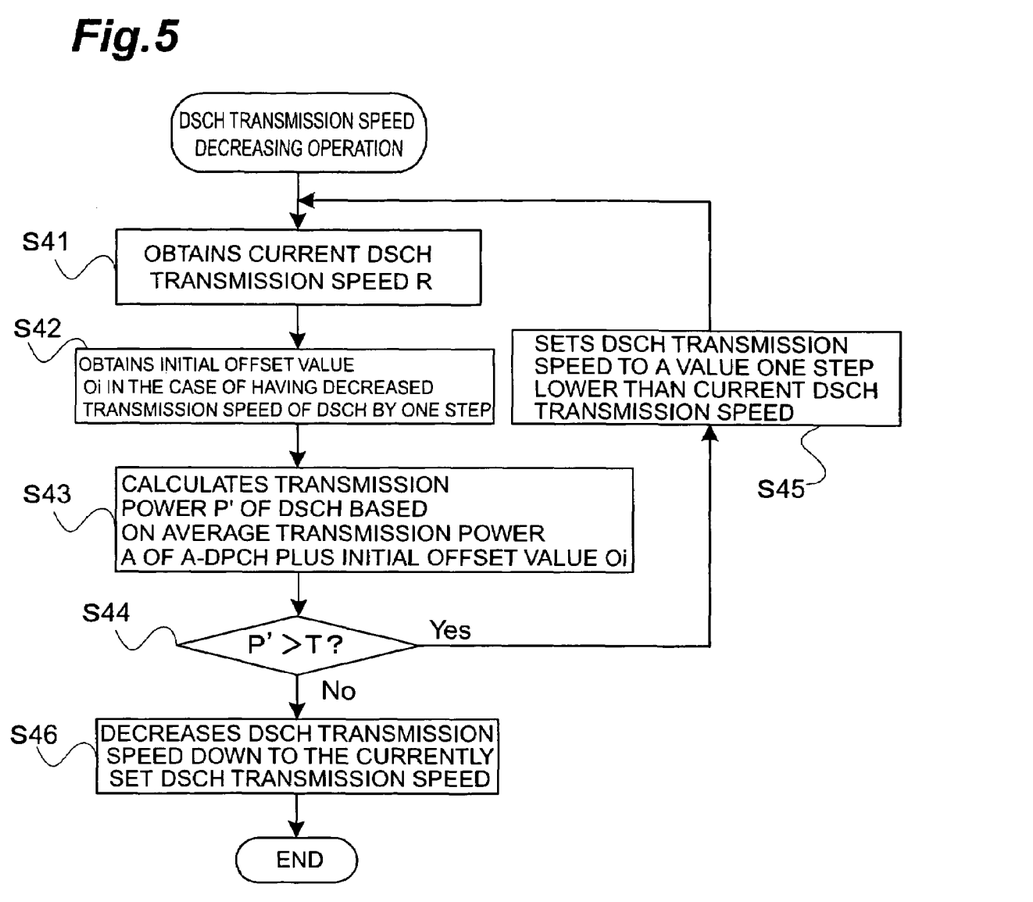
FIG. 5 is a flowchart for illustrating a DSCH transmission speed decreasing operation.
Figure 6:
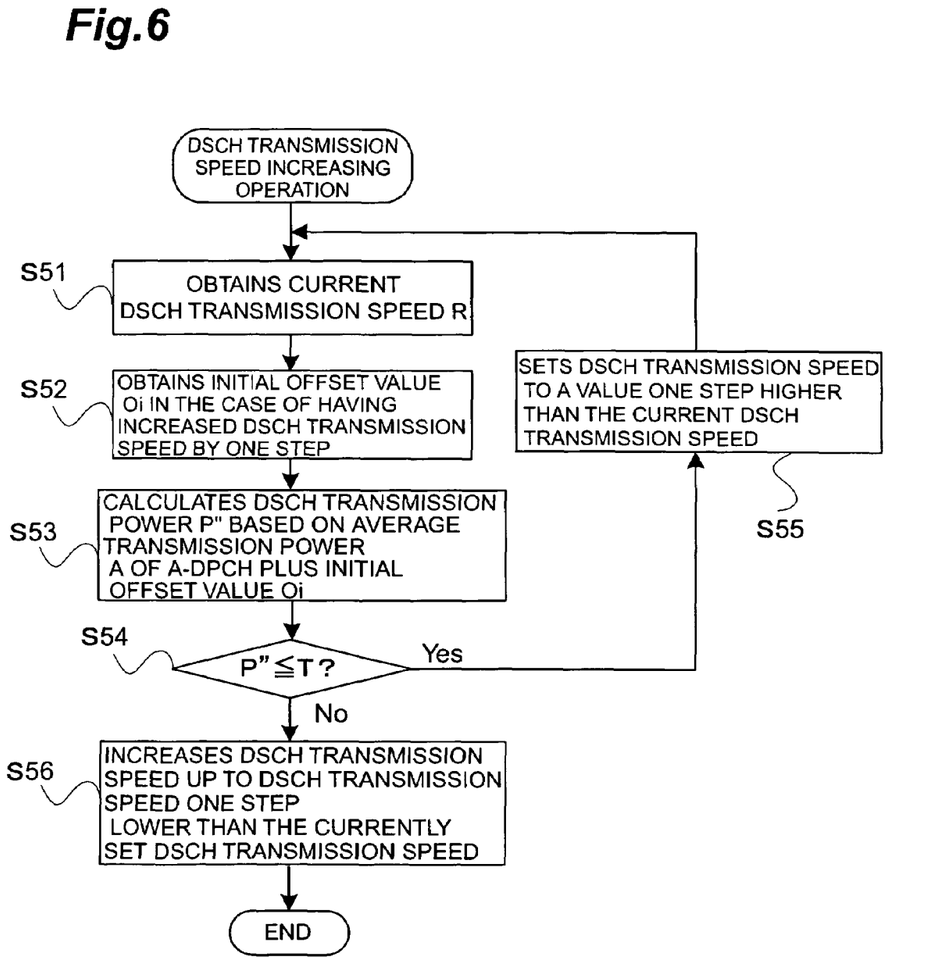
FIG. 6 is a flowchart for illustrating a DSCH transmission speed increasing operation.

Referring to FIG. 5, the DSCH transmission speed decreasing operation shown in S4 will now be described. First, in S41, the transmission speed control section 23 obtains a transmission speed R of the DSCH at the current time (time t) from the transmission speed storage region 221b.

Then, the transmission speed control section 23 obtains an initial offset value Oi in the case of having decreased the transmission speed R of the DSCH obtained in S41 by one step, from the initial offset value storage region 223b (S42). For example, in the case of the transmission speed control operation between the cell phone 41 and the public base station 31, the transmission speed of the DSCH at time t is 256 kbps. Accordingly, the transmission speed control section 23 obtains an initial offset value of 10 dB corresponding to the transmission speed 128 kbps, which is lower than 256 kbps by one step.

Next, in S43, the transmission speed control section 23 obtains an average value A of the transmission powers of the A-DPCH corresponding to the terminal ID "1" of the cell phone 41 from the average value storage region 221g. The transmission speed control section 23 calculates a transmission power P' of the DSCH based on the obtained average value A of the transmission powers of the A-DPCH and the initial offset value Oi obtained in S42. For example, in the case of the transmission speed control operation between the cell phone 41 and the public base station 31, since the average value A of the transmission powers of the A-DPCH is 24 dBm and the initial offset value obtained in S42 is 10 dB, the transmission power of the DSCH is calculated as 34 dBm.

In S44, the transmission speed control section 23 compares the transmission power P' of the DSCH calculated in S43 and the allowable maximum transmission power T obtained in S2 in FIG. 4. As a result of the comparison operation, when the transmission power P' of the DSCH is greater than the allowable maximum transmission power T (i.e., in the case of P'>T), the transmission speed control section 23 determines that the transmission power of the DSCH will still have too large a value, and sets the transmission speed of the DSCH to a value decreased by one more step (S45).

After completing S45, in order to confirm whether the transmission speed of the DSCH has to be further decreased, the transmission speed control section 23 returns to S41 and carries out the operations from S41. In S41, the transmission speed of the DSCH set in S45 is obtained as the current transmission speed R of the DSCH. The sequence of operations S41-S45 are carried out repeatedly until the comparison result in S44 meets P'≦T.

On the other hand, in S44, when the transmission power P' of the DSCH is less than or equal to the allowable maximum transmission power T (i.e., in the case of P'≦T), the transmission speed control section 23 determines that the transmission power of the DSCH is within an allowable range, and decreases the transmission speed of the DSCH to the currently set transmission speed of the DSCH (S46).

The decreased transmission speed of the DSCH is updated and stored in the transmission speed storage region 221b corresponding to the terminal ID "1". Further, the initial offset value corresponding to the decreased transmission speed of the DSCH is updated and stored in the time t data storage region 221k as the current offset value. After completing S46, the sequence of DSCH transmission speed control operations is terminated.

Next, referring to FIG. 6, the DSCH transmission speed increasing operation shown in S5 will be described in detail. First, in S51, the transmission speed control section 23 obtains a transmission speed R of the DSCH at the current time (time t) from the transmission speed storage region 221b.

Then, the transmission speed control section 23 obtains an initial offset value Oi in the case of having increased the transmission speed R of the DSCH obtained in S51 by one step, from the initial offset value storage region 223b (S52). For example, in the case of the transmission speed control operation between the cell phone 41 and the public base station 31, the transmission speed of the DSCH at time t is 256 kbps. Accordingly, the transmission speed control section 23 obtains 16 dB as an initial offset value corresponding to the transmission speed 384 kbps, which is higher than 256 kbps by one step.

Next, in S53, the transmission speed control section 23 obtains an average value A of the transmission powers of the A-DPCH corresponding to the terminal ID "1" of the cell phone 41 from the average value storage region 221g. The transmission speed control section 23 calculates the transmission power P'' of the DSCH based on the obtained average value A of the transmission powers of the A-DPCH and the initial offset value Oi obtained in S52. For example, in the case of the transmission speed control operation between the cell phone 41 and the public base station 31, since the average value A of the transmission powers of the A-DPCH is 24 dBm, and the initial offset value obtained in S52 is 16 dB, the transmission power of the DSCH is calculated as 40 dBm.

In S54, the transmission speed control section 23 compares the transmission power P'' of the DSCH calculated in S53 with the allowable maximum transmission power T obtained in S2 in FIG. 4. As a result of the comparison operation, when the transmission power P" of the DSCH is less than or equal to the allowable maximum transmission power T (i.e., in the case of P"≦T), the transmission speed control section 23 determines that the transmission power falls within the allowable range even if the transmission speed of the DSCH is increased by one step, and sets the transmission speed of the DSCH to a value increased by one step (S55).

After completing S55, in order to confirm whether the transmission speed of the DSCH can be further increased, the transmission speed control section 23 returns to S51 and carries out the operations from S51. In S51, the transmission speed of the DSCH changed in S55 is obtained as the current transmission speed R of the DSCH. The sequence of operations S51-S55 are carried out repeatedly until the comparison result in S54 meets P">T.

On the other hand, in S54, when the transmission power P" of the DSCH is greater than the allowable maximum transmission power T (i.e., in the case of P">T), the transmission speed control section 23 determines that the transmission power of the DSCH exceeds the allowable range, and proceeds to the operation of S56. In S56, the transmission speed control section 23 increases the transmission speed of the DSCH up to the transmission speed one step lower than the currently set transmission speed of the DSCH (S56).

The reason why the transmission speed of the DSCH is increased up to a step which is one step lower than the current setting is as follows. That is, the transmission speed of the DSCH set up at a point of time when the operation of S56 is carried out is a value immediately after the allowable maximum transmission power T is exceeded as a result that the transmission speed of the DSCH has been increased. Accordingly, the value immediately before the allowable maximum transmission power T is exceeded gives a value less than or equal to the allowable maximum transmission power T and a maximum transmission speed within the allowable range.

The increased transmission speed of the DSCH is updated and stored in the transmission speed storage region 221*b* corresponding to the terminal ID "1". Further, the initial offset value corresponding to the increased transmission speed of the DSCH is updated and stored in the time t data storage region 221*k* as the current offset value. After completing S56, the sequence of DSCH transmission speed control operations is terminated.

As described above, according to the mobile communication system 100 in the present embodiment, the radio control apparatus 2 comprises the transmission speed control section 23 and the memory section 22. The transmission speed control section 23 calculates the transmission power of the data signal to be transmitted to the cell phone 41 based on the transmission power of the control signal to be transmitted to the cell phone 41 and the offset value to be applied to the transmission power of the control signal. The transmission speed control section 23 compares the transmission power of the data signal with the upper limit value stored in the memory section 22, and when the transmission power of the data signal is greater than the upper limit value, performs control for decreasing the transmission speed of the data signal. This control allows the radio control apparatus 2 to supply sufficient transmission power suitable for the transmission speed to the DSCH. Accordingly, the communication quality of the data is increased. This enables to reduce the retransmission rate due to transmission error and the interference affecting other radio connections. As a result, the volume of data transmitted per unit time can be increased. On the other hand, when the transmission power of the data signal is less than or equal to the upper limit value, the radio control apparatus 2 performs control for increasing the transmission speed of the data signal. This control allows the radio control apparatus 2 to achieve a higher speed of data transmission. As a result, it is possible to achieve a high-speed data communication while suppressing the decrease of communication quality.

Preferably, the transmission speed control section 23 calculates the transmission power of the data signal based on the average value of the transmission powers of the control signal over a predetermined period of time and the average value of the offset values over a predetermined period of time. This allows the radio control apparatus 2 to control the transmission speed of the data signal based on a highly precise transmission power from which influences of fluctuation in the transmission power or the offset value accompanying any sudden change in the communication environment are maximally removed.

More preferably, when the transmission power of the data signal is greater than the upper limit value, the transmission speed control section 23 calculates the transmission power of the data signal in the case of having decreased the transmission speed of the data signal. The transmission speed control section 23 performs control for decreasing the transmission speed of the data signal until the calculated transmission power of the data signal becomes less than or equal to the upper limit value. At a point of time when the transmission power of the data signal becomes less than or equal to the upper limit value, the control for decreasing the transmission speed of the data signal is terminated. Accordingly, if the transmission speed of the data signal is decreased in order to maintain the communication quality, the transmission speed is not decreased more than necessary. As a result, it is possible to carry out data transmission with a suppressed decrease of transmission speed while maintaining the communication quality.

More preferably, when the transmission power of the data signal is less than or equal to the upper limit value, the transmission speed control section 23 calculates the transmission power of the data signal in the case of having increased the transmission speed of the data signal. The transmission speed control section 23 performs control for increasing the transmission speed of the data signal until the calculated transmission power of the data signal reaches the maximum value within a range in which the upper limit value is not exceeded. Accordingly, it is possible to perform the data transmission at the highest transmission speed within a range such that the communication quality can be maintained. As a result, the throughput can be increased more easily.

The aspect described in the present embodiment is a preferred example of the mobile communication system according to the present invention, and is not limited thereto. For example, in the present embodiment, from the viewpoint of reliability of the calculation result, the transmission power of the DSCH is calculated based on the average value of the transmission powers of the A-DPCH and the average value of the offset values. However, at least one of the transmission power of the A-DPCH and the offset value may be an instantaneous value. This enables to eliminate the operations of calculating the average value by the transmission speed control section 23, resulting in a reduction of processing load. Also, the data region for storing the previously obtained transmission powers and offset values can be saved.

In the present embodiment, although the description has been made assuming a cell phone as a mobile communication terminal, any information equipment having a radio communication function, such as PDA (Personal Digital Assistance), may be used.

Further, in the above embodiment, an example has been described in which the radio control apparatus 2 controls the transmission speed of the data signal with the transmission speed control section 23. However, the public base station 31 may be adapted to control the transmission speed of the data signal. In this case, the public base station 31 further has the above-described function of the memory section, the function of the transmission speed control section, part of the function of the queue processing section (input/output function for the control signal) and the function of the A-DPCH transmission power monitoring section.

By adopting such a configuration, the mobile communication system 100 can perform, within the public base station 31, a sequence of operations from obtaining the transmission power of the A-DPCH through the transmission speed control for the DSCH to the data transmission. Therefore, it is not necessary to perform transmission and reception of the control signal between the radio control apparatus 2 and the public base station 31. Accordingly, irrespective of the connection distance between the radio control apparatus 2 and the public base station 31, the response of the transmission speed control can be increased and maintained.

Finally, a mobile communication program according to the embodiment of the present invention and a computer-readable recording medium on which the mobile communication program is recorded (hereinafter simply referred to as "recording medium") will be described. Here, the recording medium refers to what can cause a varied state of magnetic, optical, electric or other energy corresponding to the recorded contents of the program to occur in a reading unit provided to the hardware resources of a general-purpose computer or the like, and communicate the recorded contents of the program to the reading unit in a form of signals corresponding thereto. Such recording media include, for example, not only what is removably mounted on the computer such as magnetic disk, optical-disk and magneto-optical disk, but also a HD (Hard Disk) fixedly mounted inside the computer, and an integrally and firmly fixed nonvolatile semiconductor memory of firmware.

Figure 7:
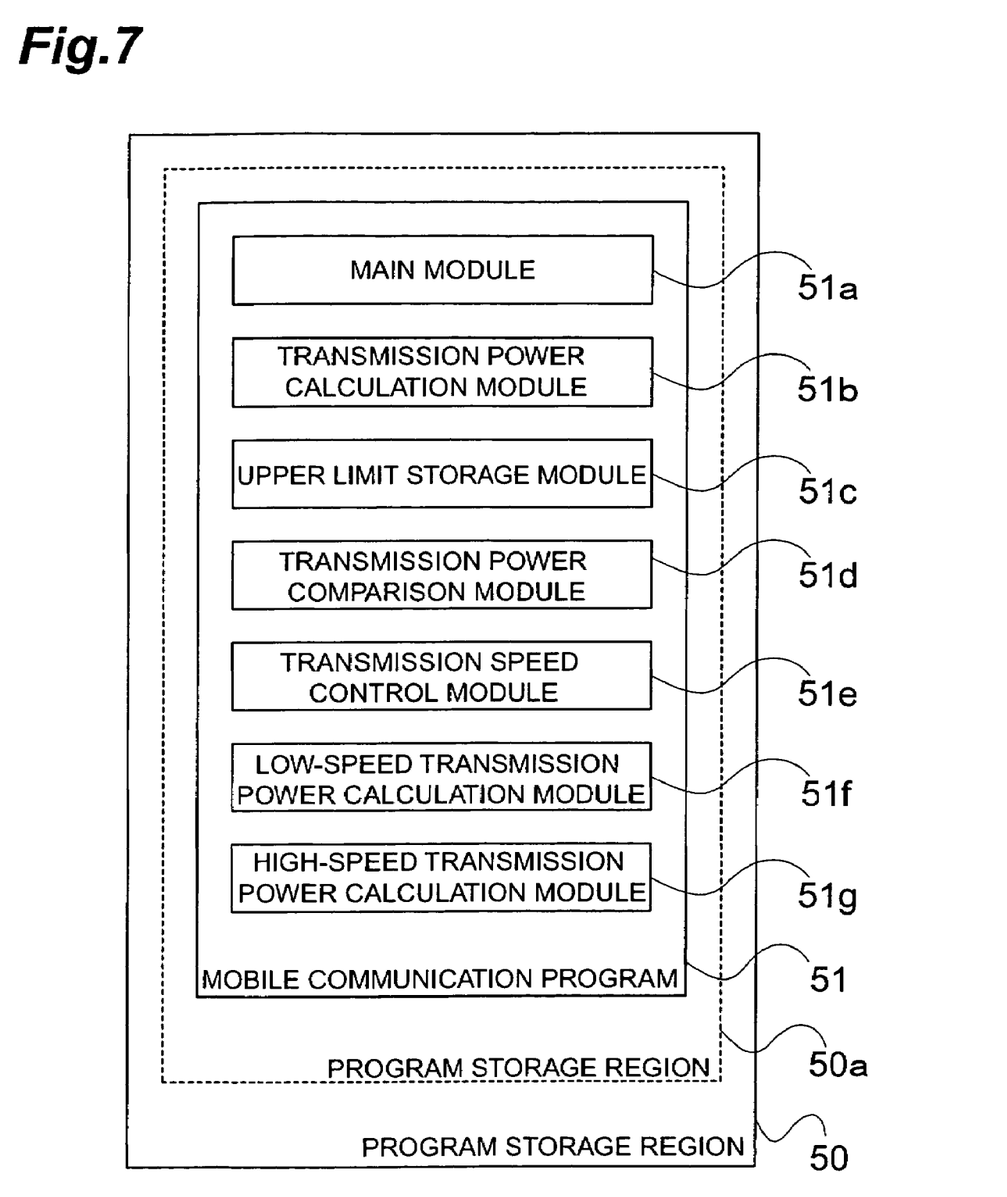
FIG. 7 is a diagram showing a configuration of a recording medium on which a program according to the present invention is stored.

FIG. 7 is a diagram showing a configuration of a recording medium according to the embodiment of the present invention. The recording medium 50 is provided with a program storage region 50*a* that stores a program as shown in FIG. 7. In the program storage region 50*a*, a mobile communication program 51 is recorded. The mobile communication program 51 comprises a main module 51*a* which is a program for controlling the downward packet communication between a cell phone and a public base station and supervises the operations, a transmission power calculation module 51*b* that calculates the transmission power of a data signal to be transmitted to a particular mobile communication terminal of a plurality of mobile communication terminals based on the transmission power of a control signal to be transmitted to the particular mobile communication terminal and an offset value to be applied to the transmission power of the control signal, an upper limit storage module 51*c* that stores an upper limit value of the transmission power of the data signal in storage means, a transmission power comparison module 51*d* that compares the calculated transmission power of the data signal with the upper limit value stored in the storage means, and a transmission speed control module 51*e* that performs control, as a result of the comparison, for decreasing the transmission speed of the data signal when the transmission power of the data signal is greater than the upper limit value, and for increasing the transmission speed of the data signal when the transmission power of the data signal is less than or equal to the upper limit value.

Preferably, the mobile communication program 51 comprises a low-speed transmission power calculation module 51*f* that calculates the transmission power of the data signal in the case of having decreased the transmission speed of the data signal when the transmission power of the data signal is greater than the upper limit value as a result of the comparison, and a high-speed transmission power calculation module 51*g* that calculates the transmission power of the data signal in the case of having increased the transmission speed of the data signal when the transmission power of the data signal is less than or equal to the upper limit value as a result of the comparison.

Here, the upper limit storage module 51*c* is a module that performs an operation for storing data similar to the data stored in the memory section 22 of the radio control apparatus 2, into storage means such as a HD or memory. The function achieved by operating each of the transmission power calculation module 51*b*, the transmission power comparison module 51*d*, the transmission speed control module 51*e*, the low-speed transmission power calculation module 51*f* and the high-speed transmission power calculation module 51*g* is the same as the function of the transmission speed control section 23 included in the radio control apparatus 2.

The mobile communication program 51 may be configured such that part or all thereof is received by a communication unit of a computer from another equipment through a transmission medium such as a communication line, and then recorded. To the contrary, it may be configured such that the mobile communication program 51 is transmitted through a transmission medium and installed in another equipment.

INDUSTRIAL APPLICABILITY

According to the present invention, the transmission speed of the data signal transmitted in a time-division manner on a channel common to a plurality of mobile communication terminals is dynamically controlled depending on the transmission power of the control signal transmitted on a channel specific to each of the plurality of mobile communication terminals. That is, when the transmission power of the data signal is greater than the upper limit value, control for decreasing the transmission speed of the data signal is carried out. This control allows a sufficient transmission power suitable for the transmission speed to be supplied to the DSCH, resulting in an increase of the communication quality of the data. On the other hand, when the transmission power of the data signal is less than or equal to the upper limit value, control for increasing the transmission speed of the data signal is carried out. This control allows the speed of the data transmission to be increased. As a result, a high-speed data communication can be achieved while suppressing the decrease of communication quality.

The invention claimed is:

1. A radio control apparatus for controlling downward packet communication between a mobile communication terminal and a base station by using a channel individually allocated to each of a plurality of mobile communication terminals to cause a control signal to be transmitted between each mobile communication terminal and the base station to at least establish a later occurring data communication using a channel common to the plurality of mobile communication terminals in a time-division manner to cause a data signal to be transmitted to each mobile communication terminal and the base station, comprising:

calculation means for calculating a transmission power as to the data signal to be transmitted between a particular mobile communication terminal of said plurality of mobile communication terminals and the base station based on a predetermined value of transmission power of the control signal to be transmitted between the particular mobile communication terminal and the base station and a predetermined offset value;

storage means for storing an upper limit value of the transmission power of said data signal;

comparison means for comparing the transmission power of the data signal calculated by said calculation means with said upper limit value stored in said storage means and for providing a comparison output based thereon; and control means for receiving said comparison output and for performing control to decrease the transmission speed of said data signal when the transmission power of said data signal calculated by said calculation means is indicated by the comparison output to be greater than said upper limit value, and to increase the transmission speed of said data signal when the transmission power of said data signal calculated by said calculation means is indicated by the comparison output to be less than said upper limit value.

2. The radio control apparatus according to claim 1, wherein said predetermined value of the transmission powers of said control signal to be transmitted between the particular mobile communication terminal and the base station is determined based on an average value of a plurality of transmission powers of said control signal transmitted between the particular mobile communication terminal and the base station obtained at different times over a predetermined period of time and said predetermined offset value is determined based on an average value of offset values related to each particular communication terminal obtained over a predetermined period of time.

3. The radio control apparatus according to claim 1, further comprising low-speed transmission power calculation means included in the calculation means for calculating the transmission power of the data signal in the case of having decreased the transmission speed of said data signal when the transmission power of said data signal is indicated by the comparison output to be greater than said upper limit value, wherein said control means performs control to decrease the transmission speed of said data signal until the transmission power of the data signal calculated by said low-speed transmission power calculation means becomes less than or equal to said upper limit value.

4. The radio control apparatus according to claim 1, further comprising high-speed transmission power calculation means included in the calculation means for calculating the transmission power of the data signal in the case of having increased the transmission speed of said data signal when the transmission power of said data signal is indicated by the comparison output to be less than said upper limit value, wherein said control means performs control to increase the transmission speed of said data signal until the transmission power of the data signal calculated by said high-speed transmission power calculation means reaches a maximum value within a range in which said upper limit value is not exceeded.

5. A mobile communication system comprising the radio control apparatus according to claim 1 and a base station controlled by the control means of said radio control apparatus, the base station transmitting the data signal to said mobile communication terminal at the transmission speed of said data signal, wherein communication is carried out between said radio control apparatus and said base station.

6. A mobile communication method performed by a radio control apparatus for controlling downward packet communication between a mobile communication terminal and a base station by using a channel individually allocated to each of a plurality of mobile communication terminals to cause a control signal to be transmitted between each mobile communication terminal and the base station to at least establish a later occurring data communication using a channel common to the plurality of mobile communication terminals in a time-division manner to cause a data signal to be transmitted between each mobile communication terminal and the base station, comprising:

calculating step of calculating a transmission power as to the data signal to be transmitted between a particular mobile communication terminal of said plurality of mobile communication terminals and the base station based on a predetermined value of transmission power of the control signal to be transmitted between the particular mobile communication terminal and the base station and a predetermined offset value;

a storing step of storing an upper limit value of the transmission power of said data signal in storage means;

a comparing step of comparing the transmission power of the data signal calculated in said calculating step with said upper limit value stored in said storage means and providing a comparison output based thereon;

a receiving step of receiving said comparison output; and a controlling step of decreasing the transmission speed of said data signal when the transmission power of said data signal calculated in said calculating step is greater than said upper limit value, and increasing the transmission speed of said data signal when the transmission power of said data signal calculated in said calculating step is less than said upper limit value.

7. The mobile communication method according to claim 6, wherein said predetermined value of the transmission powers of said control signal to be transmitted between the particular mobile communication terminal and the base station is determined based on an average value of a plurality of transmission powers of said control signal transmitted between the particular mobile communication terminal and the base station obtained at different times over a predetermined period of time and said predetermined offset value is determined based on an average value of offset values related to each particular communication terminal obtained over a predetermined period of time.

8. The mobile communication method according to claim 6, wherein the step of calculating includes a low-speed transmission power calculating step of calculating the transmission power of the data signal in the case of having decreased the transmission speed of said data signal when the transmission power of said data signal is greater than said upper limit value as a result of comparison in said comparing step, and wherein said controlling step comprises decreasing the transmission speed of said data signal calculated in said low-speed transmission power calculating step until the transmission power of the data signal calculated in said low-speed transmission power calculating step becomes less than or equal to said upper limit value.

9. The mobile communication method according to claim 6, wherein the step of calculating includes a high-speed transmission power calculating step of calculating the transmission power of the data signal in the case of having increased the transmission speed of said data signal when the transmission power of said data signal is less than said upper limit value as a result of comparison in said comparing step, and wherein said controlling step comprises increasing the transmission speed of said data signal calculated in said high-speed transmission power calculating step until the transmission power of the data signal calculated in said high-speed transmission power calculating step reaches a maximum value within a range in which said upper limit value is not exceeded.

10. A mobile communication program included on a storage medium, said mobile communication program controlling downward packet communication between a mobile communication terminal and a base station by using a channel individually allocated to each of a plurality of mobile communication terminals to cause a control signal to be transmitted between each mobile communication terminal and the base station to at least establish a later occurring data communication using a channel common to the plurality of mobile communication terminals in a time-division manner to cause a data signal to be transmitted between each mobile communication terminal and the base station, said mobile communication program included on a storage medium instructing a computer to perform:

a calculating operation for calculating a transmission power as to the data signal to be transmitted between a particular mobile communication terminal of said plurality of mobile communication terminals and the base station based on a predetermined value of transmission power of the control signal to be transmitted between the particular mobile communication terminal and the base station and a predetermined offset value;

a storing operation for storing an upper limit value of the transmission power of said data signal in storage means;

a comparing operation for comparing the transmission power of the data signal calculated by said calculating operation with said upper limit value stored in said storage means and for providing a comparison output based thereon; and a controlling operation receiving said comparison output and for performing control to decrease the transmission speed of said data signal when the transmission power of said data signal calculated by said calculating operation is indicated by the comparison output to be greater than said upper limit value, and to increase the transmission speed of said data signal when the transmission power of said data signal calculated by said calculating operation is indicated by the comparison output to be less than said upper limit value.

11. The mobile communication program included on a storage medium according to claim 10, wherein said predetermined value of the transmission powers of said control signal to be transmitted between the particular mobile communication terminal and the base station is determined based on an average value of a plurality of transmission powers of said control signal transmitted between the particular mobile communication terminal and the base station obtained at different times over a predetermined period of time and said predetermined offset value is determined based on an average value of offset values related to each particular communication terminal obtained over a predetermined period of time.

12. The mobile communication program included on a storage medium according to claim 10, further instructing the computer to perform a low-speed transmission power calculating operation as the calculating operation for calculating the transmission power of the data signal in the case of having decreased the transmission speed of said data signal when the transmission power of said data signal is greater than said upper limit value as a result of comparison in said comparing operation, wherein said controlling operation instructs the computer to perform an operation to decrease the transmission speed of said data signal until the transmission power of the data signal calculated by said low-speed transmission power calculating operation becomes less than or equal to said upper limit value.

13. The mobile communication program included on a storage medium according to claim 10, further instructing the computer to perform a high-speed transmission power calculating operation as the calculating operation for calculating the transmission power of the data signal in the case of having increased the transmission speed of said data signal when the transmission power of said data signal is less than said upper limit value as a result of comparison in said comparing operation, wherein said controlling operation instructs the computer to perform an operation to increase the transmission speed of said data signal until the transmission power of the data signal calculated by said high-speed transmission power calculating operation reaches a maximum value within a range in which said upper limit value is not exceeded.

* * * * *